Sept. 6, 1955 F. O. HESS ET AL 2,716,968
SPLIT FURNACE AND TUBE SUPPORT
Original Filed April 23, 1947 3 Sheets-Sheet 1
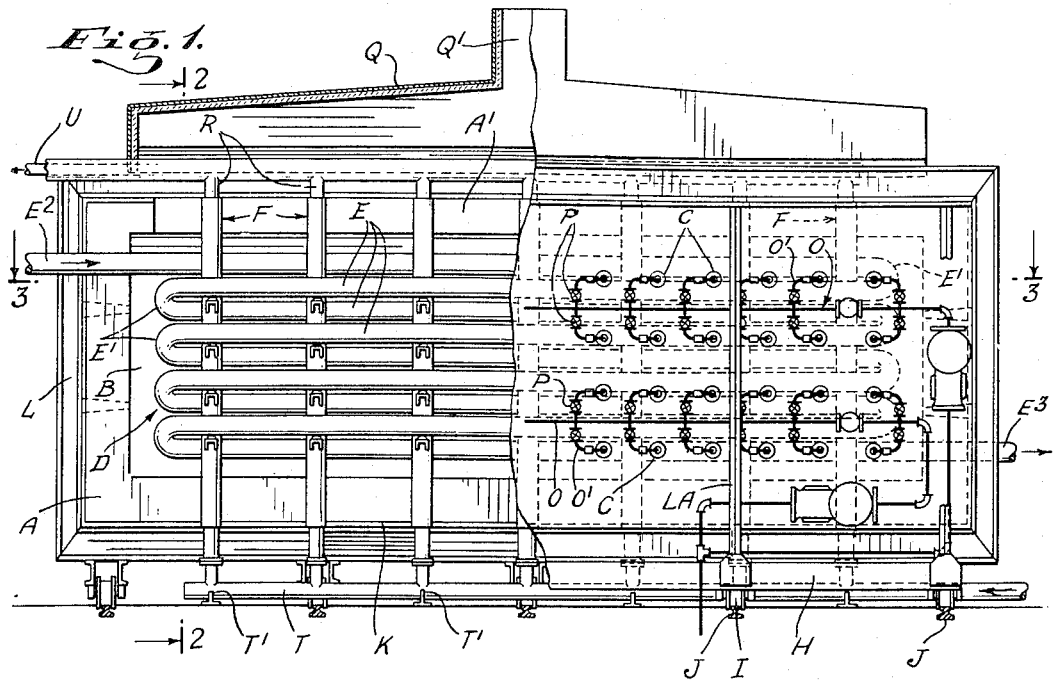
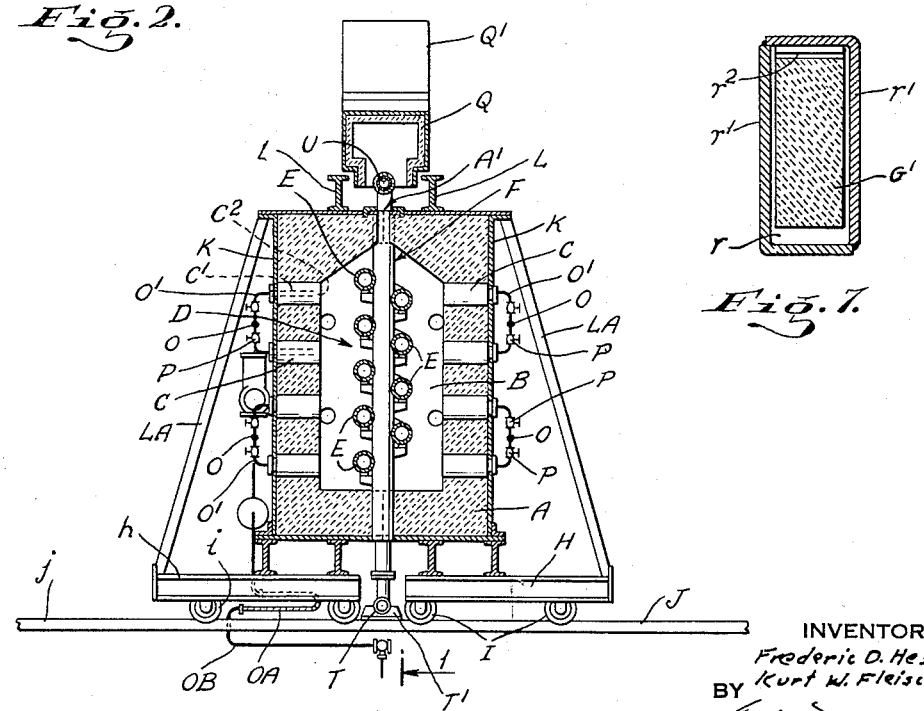
INVENTORS
Frederic O. Hess
Kurt W. Fleischer
BY
ATTORNEY Sept. 6, 1955     F. O. HESS ET AL     2,716,968
SPLIT FURNACE AND TUBE SUPPORT
Original Filed April 23, 1947     3 Sheets-Sheet 2
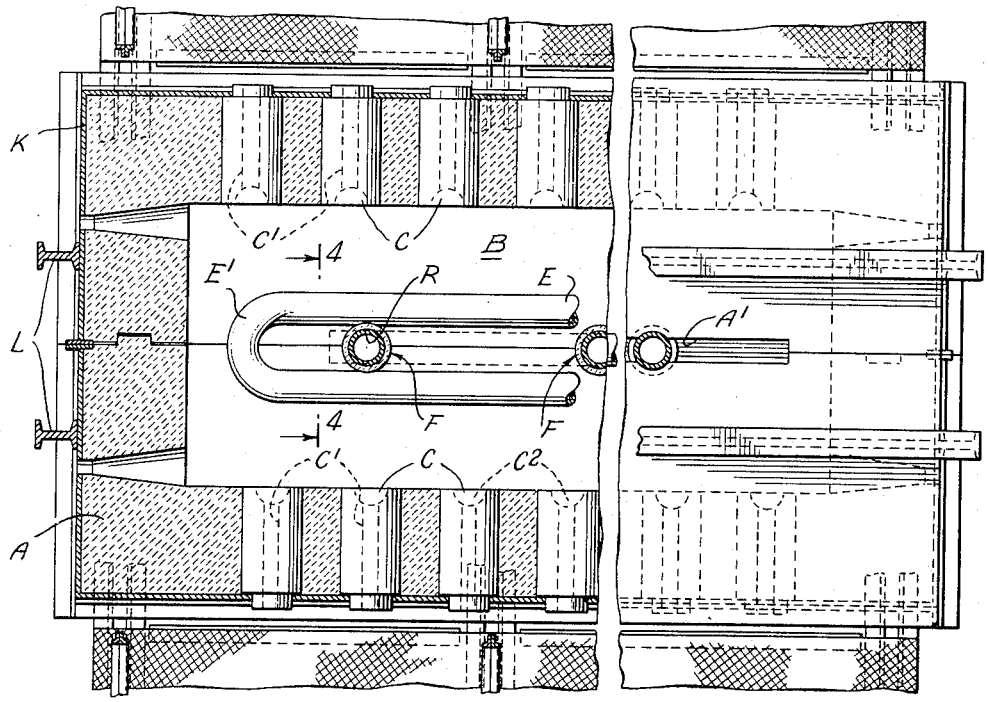
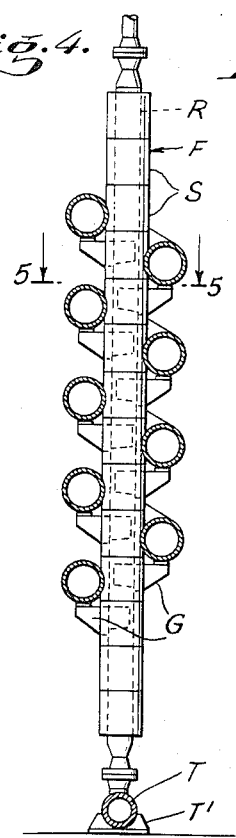
Fig. 4.
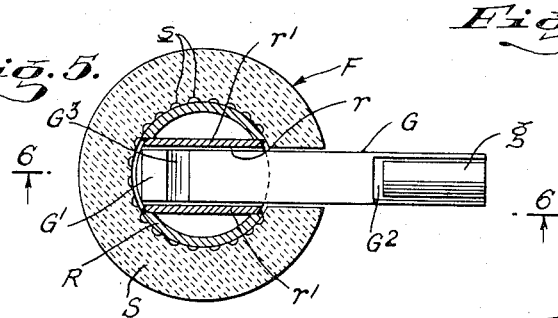
Fig. 5.
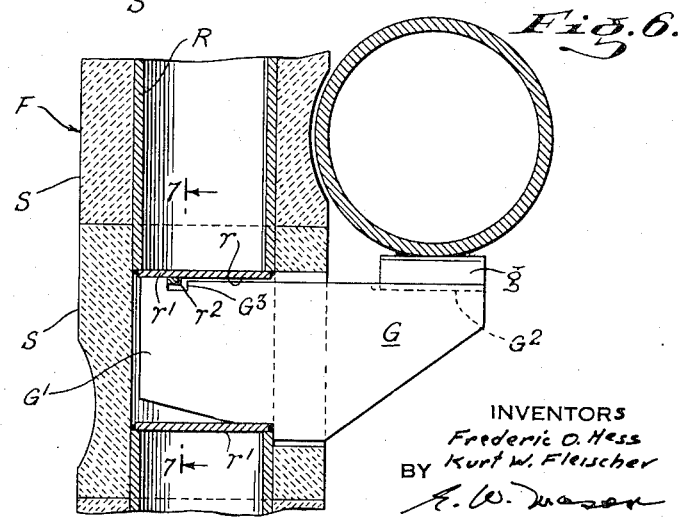
Fig. 6.
INVENTORS
Frederic O. Hess
Kurt W. Fleischer
BY
ATTORNEY

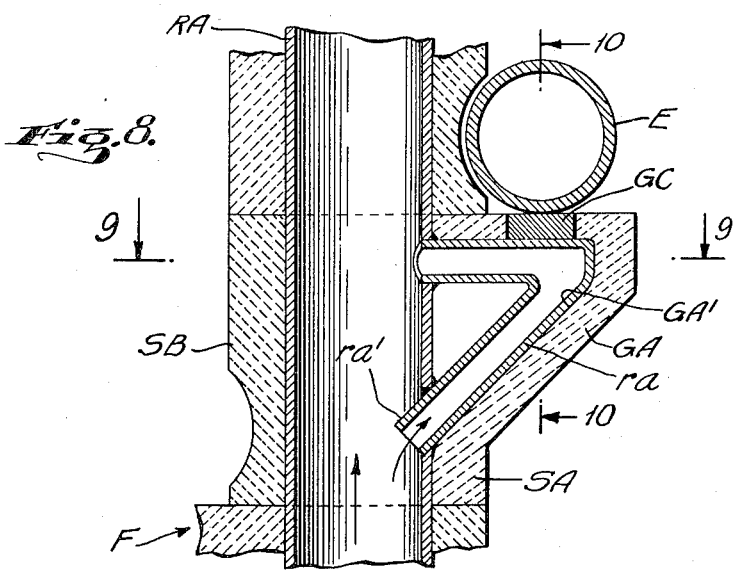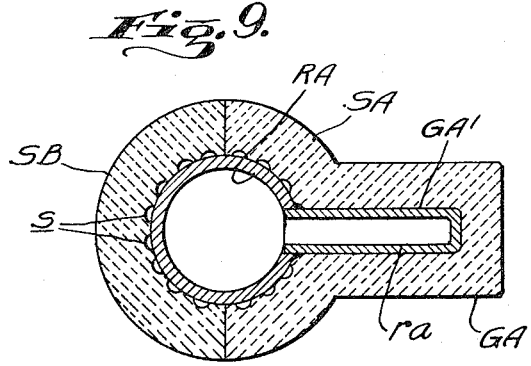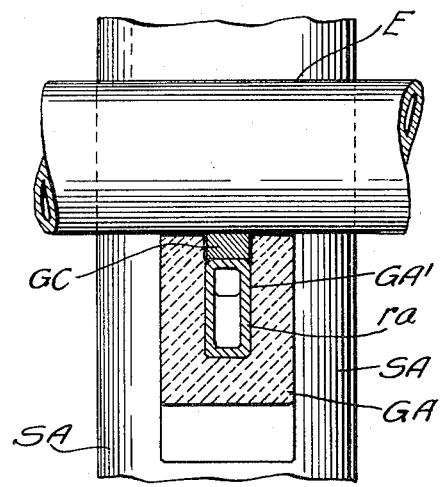

United States Patent Office 2,716,968
Patented Sept. 6, 1955

2,716,968
SPLIT FURNACE AND TUBE SUPPORT

Frederic O. Hess and Kurt W. Fleischer, Philadelphia, Pa., assignors to Selas Corporation of America, Philadelphia, Pa., a corporation of Pennsylvania Original application April 23, 1947, Serial No. 743,358, now Patent No. 2,606,536, dated August 12, 1952. Divided and this application December 26, 1951, Serial No. 263,247

6 Claims. (Cl. 122—510)

The present application is a division of our copending application Serial No. 743,358, filed April 23, 1947, now Patent 2,606,536.

The general object of the present invention is to provide improved fluid heating apparatus of the general type commonly referred to as tubular fluid heaters, in which the fluid heated flows through a bank of spaced apart parallel tubes located in a heating chamber. The fluid passing through the tubes of such a heater may be a liquid, vapor or gas.

The invention is primarily devised and adapted for use in oil cracking and other processes in which the fluid flowing through the tubes is heated to temperatures varying from 1500° to 2200° F., although the invention may be used in heating fluids to temperatures somewhat higher than 2200° F., and to temperatures substantially lower than 1500° F. In the preferred form of the present invention, the heat utilized is produced by the combustion of a combustible mixture of air and gas by means of gas burners mounted in the refractory wall of the heating chamber and heating portions of said wall to incandescence, so that much of the heat liberated is radiated to the tubes from the heating walls and from the burner flames and combustion gases, though some of the heat absorbed by the fluid is transmitted to the tubes by convection heating.

An object of the invention is to provide a supporting frame or rack for the parallel spaced apart tubes of the tube bank, which is well adapted to withstand high operating temperatures and which includes readily replaceable bracket-like parts of ceramic material on which the tubes are directly supported and which are supported by water cooled metallic members. Another specific object of the invention is to provide a tube supporting structure which has practically no tendency to vary significantly in shape or form as the result of variations in its temperature, so that it is well adapted for use when the tubes are formed of quartz connected at their ends by return bends also formed of quartz, as is desirable in some cases. Such a tube structure does not expand or contract to any significant extent as a result of changes in its temperature, and might be subjected to damaging strains by substantial changes in the form of dimensions of the tube supporting structure.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described preferred embodiments of the invention.

Of the drawings:

Fig. 1 is an elevation partly in section on the line 1—1 of Fig. 2;

Fig. 2 is an elevation partly broken away and in section on the line 2—2 of Fig. 1;

Fig. 3 is a plan partly broken away and in section on the line 3—3 of Fig. 1;

Fig. 4 is a vertical section through the tube bank taken on the line 4—4 of Fig. 3;

Fig. 5 is a section on the line 5—5 of Fig. 4;

Fig. 6 is a section on the line 6—6 of Fig. 5;

Fig. 7 is a partial section on the line 7—7 of Fig. 6;

Fig. 8 is a vertical section taken similarly to Fig. 4 and illustrating a modification;

Fig. 9 is a section on the line 9—9 of Fig. 8; and

Fig. 10 is a partial section on the line 10—10 of Fig. 8.

The preferred embodiment of the invention illustrated by way of example in the drawings, is a continuous tubular heater comprising a furnace structure A enclosing a furnace chamber B. The latter is horizontally elongated and is of a height which ordinarily, and as shown, is appreciably less than its length, and is of a width appreciably less than its height. The furnace is heated by burners C incorporated in the side walls of the furnace chamber. A plurality of horizontal, parallel, spaced apart tube sections E are arranged in a bank or stack D comprising two side by side vertical rows, centrally disposed in the furnace chamber. The tube sections E are supported by a tube rack or frame comprising a row of vertical columns F between the two rows of tubes, and lateral brackets G carried by the columns at their opposite sides, and directly supporting the tube sections.

Ready access to the heating chamber when necessary or desirable for inspection, repairs or replacements, is made possible by forming the furnace structure A in two generally similar separable sections, respectively located at opposite sides of a vertical separation plane which passes approximately midway between the two side by side rows of tubes E. In the preferred construction shown, the right half portion of the furnace wall structure, as seen in Fig. 2, is mounted on a truck or movable platform H having wheels I running on track rails J extending transversely to the length of the furnace beneath and to each side of the latter. The left half portion of the furnace wall structure is mounted on a platform h having wheels i which also run on the rails J. As shown, the platform h and wheels i are like the platform H and wheels I, respectively, and the furnace portions respectively supported on the platforms H and h are similar in construction. Each of said furnace portions comprises refractory material forming one side wall and half of the top and bottom walls of the furnace chamber and half of each end wall of the furnace chamber B, and a metallic casing part K and metallic buckstays L at the outer side of the casing structure and braces LA, all arranged to give suitable mechanical strength and rigidity to each half furnace part, and to anchor it on the corresponding platform H or h.

Advantageously, and as shown, the burners C are of a type adapted to burn a combustible mixture of air and gas. In the form shown, the burners comprise blocks of ceramic material incorporated in the furnace chamber side walls and each formed with a central longitudinal passage C' terminating at its inner end in a shallow cup shaped combustion space $C^2$. The latter receives a combustible mixture through the passage C', and passes gaseous products of combustion into the furnace chamber B proper, and its concave wall radiates heat into the furnace chamber. Each of said burner passages C' is connected at the outer side of the furnace wall, preferably through an individually regulable pipe branch O', to a fuel and air supply piping system O secured to the corresponding side of the furnace wall. The piping systems O each customarily includes various regulating and control valves including a throttling valve P in each of the branches O'. Each piping system O is ordinarily connected by a flexible pipe connection OA to a stationary supply pipe OB. The latter preferably supplies to the distribution system fuel gas and combustion air mixed in substantially the proportion required for complete combustion.

The burners C are advantageously of the type disclosed in the prior Patent No. 2,215,081, granted September 17, 1940, on the application of F. O. Hess, one of the applicants herein. A burner of that type is characterized by the introduction of the combustible mixture into its cup shaped combustion chamber, in the form of a multiplicity of fine streams or jets distributed about the burner axis and each extending away from the burner axis alongside an adjacent portion of the combustion chamber wall so that the fuel and air jets burn alongside and in close proximity to the concave refractory wall or combustion chamber. The products of combustion formed eventually escape from the furnace chamber through an elongated roof slot or space A' between the adjacent upper edge portions of the separable halves of the furnace structure. As shown in Figs. 1 and 2, the combustion gases passing through the roof slot A' are drawn into and through an elongated hood Q with a central outlet Q'. The latter may be connected to a stack or other hot gas exhauster which need not be shown or described.

In the preferred form shown, each of the columns F included in the tube supporting rack or frame D comprises a tubular metallic pipe or core part R encased in a tubular shell formed of end to end tubular sections S of ceramic material. The different columns F are anchored at their lower ends. To this end, each core or pipe part R has its lower end section welded at its lower end to a horizontal pipe T mounted in and secured to saddle-like supports T' anchored in the substructure supporting the track rails J. The columns F extend upward through the roof slot A' in the furnace when its two halves are in their normal abutting relation, as shown in Fig. 3 and in full lines in Fig. 2. The upper ends of the metallic pipe or core part R are welded to and open into a horizontal pipe U. The pipes T and U serve as the supply and outlet pipes respectively of a circulation system for passing water upward through the pipes or metallic cores R of the columns F to keep said cores at a substantially constant and relatively low temperature. The pipes R are thus not only protected against injurious overheating, but kept from appreciable expansion and contraction as a result of temperature changes. The last mentioned result is especially important when the tubes E and their return bend end connections E' are formed of quartz, as they may well be for use in heating corrosive liquids and vapors. Each of the pipes R supports vertical rows of tube supporting brackets at its opposite sides, there being one such bracket beneath each of the tubes E in the tube bank. In the desirable forms illustrated, each bracket comprises refractory material supported by a metallic part welded to the pipe R, and cooled by the fluid flowing through the pipe. One form of these metallic parts is included in the structure illustrated in Figs. 1 to 7, and an alternative form is illustrated in Figs. 8, 9 and 10.

In the tube supporting arrangement shown in Figs. 1 to 7, each of the pipes R is formed with a recess or pocket r at each tube supporting level which extends into but does not close the path of the cooling fluid flowing through the pipe, and is open at one side of the latter to receive the tenon-like end portion G' of a tube supporting bracket G. In the particular structural form shown, each recess or pocket r is in the form of a tunnel which extends diametrically through the pipe R and is open at each end. Each tunnel part r has its wall in the form of a tube, rectangular in cross-section, and has its ends welded to the pipe R at the margins of the openings in the opposite sides of the pipe wall in register with the bore of the tunnel. In the particular form shown in Figs. 5, 6 and 7, each pocket part r is formed by welding together the edges of the flanges of two angle bar sections, to thereby form a short tube of rectangular cross-section.

The tube supporting brackets G are advantageously formed of some relatively strong ceramic material, preferably silicon carbide, which is adapted to withstand the temperatures and to support the tube load to which it is subjected. The ceramic shell formed by the section S surrounding each pipe R are notched at one end of each pocket r to receive the corresponding bracket tenon G'. In the desirable construction shown, the horizontal upper edge of the external end portion of each bracket G is formed with a shallow groove $G^2$ extending radially away from the corresponding tubular part R and providing a cradle-like support for a cylindrical ceramic body g which directly engages and supports the underside of the tube E above the corresponding bracket G.

When the body g is removed from its seat $G^2$ in the corresponding bracket G, the latter is easily removed from its pocket r for replacement if necessary, by a similarly shaped fresh bracket part which can then be readily inserted in the pocket. After the replacement bracket G is in place, a cylindrical part g is inserted in its groove seat $G^2$. In the preferred construction shown, a lug $r^2$ is welded to the undersurface of the top wall of the pocket r and each bracket is formed with a notch $G^3$ into which said lug extends so that the bracket G is locked against horizontal movement out of the tunnel. Each bracket part G, however, is proportioned and has the underside of its tenon portion G' inclined so that when the cylindrical part g is not mounted in the bracket seat $G^2$, the bracket may be tilted to move the top edge of the portion of the bracket tenon below the level of the underside of the lug $r^2$ so that the latter will not interfere with the movement of the tenon G' into and out of the pocket r. In consequence of the moderate temperature conditions to which they are subjected, the particular metal forming the walls of the pipes R and the pockets r is relatively unimportant, though there is an obvious advantage in using a metal relatively immune to the oxidizing action of the furnace atmosphere and of the water or other cooling fluid flowing through the pipes.

In the modification shown in Figs. 8, 9 and 10, the metallic core pipe RA of the tube rack column F differs from the pipes R of the construction first described, in the omission of the tunnel parts r, and the use in lieu of each such part of a small diameter elbow shaped tube ra. Each tube ra is preferably of rectangular cross-section and is welded to the corresponding pipe RA and extends away from the latter to form a tube bracket supporting member. Each member ra comprises a horizontal upper leg and a downwardly inclined lower leg. Advantageously and as shown, a lower end portion ra' of the lower leg of each elbow pipe ra extends into its supporting pipe RA and serves as a scoop to deflect some of the up flowing water in the pipe RA through the elbow pipe, as indicated by the arrows in Fig. 8. Each leg of each elbow tube ra is ordinarily welded to the corresponding pipe RA at the margin of the opening formed in the latter to receive the end of said leg.

In the form of the invention shown in Figs. 8 to 10, each ceramic bracket portion GA is in the form of a hollow lug integrally connected to a semi-cylinder SA, which in conjunction with a second semi-cylinder SB of ceramic material forms a section of the ceramic shell enclosing the pipe RA. Each of the tubular ceramic sections formed by part SA and associated part SB extends from the level of the underside of a tube E in one tube row to the level of the underside of the tube in the other and opposed tube row at the next higher level. The hollow interior GA' of the ceramic bracket part GA is shaped to receive and snugly house the corresponding metallic tubular part ra. As shown, each ceramic part GA is formed with an opening in the top wall of the space GA' to receive a removable part GC which preferably is of rectangular prism form and is directly supported by the upper horizontal leg of the corresponding tubular part ra. The part CC may be formed of metal or of strong ceramic material such as silicon carbide and is free to move longitudinally of the tube E which it supports when that expands and contracts in response to temperature changes. The described construction of the ceramic parts GA and SB permits each such part to be separately replaced in the event of its failure or impairment.

The abutting vertical edges of the ceramic shell sections SA and SB are advantageously cemented together. The shell S of the construction shown in Figs. 1 to 7 may also be formed of semi-cylindrical sections having abutting edges cemented together. In each form, the ceramic shell may have its inner wall formed with small grooves s forming air insulation spaces between the ceramic shell and metallic pipe core and thus reducing the amount of heat transferred from the ceramic shell to the metallic core which it surrounds.

The present invention may be used with advantage in apparatus varying widely in dimensions and capacity, and in heating various liquid and gaseous fluids to various temperatures. The invention is especially useful, however, in heating a fluid to relatively high temperatures by the transfer of heat at relatively rapid and regulated rates to the tubes through which the fluid flows. Merely by way of illustration and example, it is noted that in one practical embodiment of the invention in the form shown in the drawings, the tubes E in the tube bank are connected to form a continuous flow path between its inlet and outlet ends $E^2$ and $E^3$ which is about 175 feet long, the internal diameter of the tubes being about 6 inches. The gaseous type fluid flowing through the tubes in said embodiment of the invention, is heated from an inlet temperature of about 300° F. to an outlet temperature of about 1832° F. The invention is well adapted for use, however, in units which are larger and smaller than the one just referred to. Thus, for example, the invention is well adapted for use in an oil refinery still in which the tube bank may be 60 feet long and 40 feet high. In such an installation the tubes may be formed of alloy steel, and may be supported in some cases at least, on racks or by hangers in the manner therefore customary.

Where the conditions of operation are such as to make it necessary or practically desirable to use the ceramic brackets G or other supports for the fluid heating tubes, which may require relatively frequent replacements or repairs, there is an especial advantage in forming the main furnace structure in separable parts, each movable back and forth between its normal position and a second position more distant from the tube bank to provide access to the space between the tube bank and the burner walls which may be entered for inspection, repair and replacement purposes without requiring the furnace structure to be first cooled down to atmospheric temperatures. As those skilled in the art will recognize, hydraulic or other servomotors of known type may be used to move the trucks or platforms H and h back and forth along the track rails J.

While in accordance with the provisions of the statutes we have illustrated and described the best forms of embodiment of our invention now known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. A supporting structure for superposed horizontal fluid heater tubes and adapted to withstand high temperatures and comprising a vertically disposed metallic pipe adapted to be cooled by the flow of a fluid through its bore and formed with horizontally extending hollow pockets having metallic walls which extend diametrically through the pipe in the same direction at different levels but do not close the pipe bore, said pockets being rigidly attached to the pipe at opposite sides thereof where the pocket extends through the pipe, and adjacent pockets being open at opposite sides of the pipe, and brackets of heat resistant material each having a portion extending into and removably anchored in a corresponding one of said pockets and having a tube supporting portion external to and extending away from said pipe.

2. A tube supporting structure as specified in claim 1, including a ceramic shell surrounding said pipe.

3. A tube supporting structure as specified in claim 2, in which said shell is formed in replaceable sections.

4. A supporting structure for superposed horizontal fluid heater tubes and adapted to withstand high temperatures and comprising a vertically disposed metallic pipe adapted to be cooled by the flow of a fluid through its bore and formed with pockets having metallic walls and extending into the pipe at different levels but not closing the pipe bore, and each pocket being open at one side of the pipe, and removable brackets each having a portion extending into and removably anchored in a corresponding one of said pockets and having a tube supporting portion extending away from said pipe, each bracket being formed with a shoulder at the top of its pocket entering portion and the top wall of the pocket entered being provided with a shoulder adapted to engage the first mentioned shoulder to prevent the bracket from being moved out of the pocket while in its normal horizontal attitude but permitting movement of the first mentioned shoulder beneath the second mentioned shoulder when the outer portion of said bracket is tilted upwardly relatively to the portion inserted in said pocket.

5. A supporting structure as specified in claim 4, including a tube supporting part removably received between the lower side of a tube supported by a said bracket anchored in the vertically disposed pipe and the outer portion of said bracket.

6. A supporting structure as specified in claim 4, in which end to end tubular sections of ceramic material surround said pipe and are formed with openings in register with said pockets.

References Cited in the file of this patent

UNITED STATES PATENTS

| Number | Name | Date |
|---|---|---|
| 539,364 | Lipphard | May 14, 1895 |
| 622,778 | Nordyke | Apr. 11, 1899 |
| 996,926 | Harrington | July 4, 1911 |
| 1,380,570 | Lehman | July 7, 1921 |
| 1,622,303 | Wyld et al. | Mar. 29, 1927 |
| 1,748,656 | Saemisch | Feb. 25, 1930 |
| 1,850,021 | Marrone et al. | Mar. 15, 1932 |
| 2,325,945 | Fuchs | Aug. 3, 1943 |
| 2,513,626 | Corriston | July 4, 1950 |
| 2,557,569 | Schutt | June 19, 1951 |
| 2,578,332 | Williams | Dec. 11, 1951 |
| 2,606,536 | Hess et al. | Aug. 12, 1952 |
| 2,619,077 | Schauble et al. | Nov. 25, 1952 |
| 2,652,037 | Lewis et al. | Sept. 15, 1953 |

FOREIGN PATENTS

| Number | Country | Date |
|---|---|---|
| 353,226 | Great Britain | July 23, 1931 |